H. D. RANKIN.
DIGESTING APPARATUS.
APPLICATION FILED JUNE 26, 1918.
1,364,803.
Patented Jan. 4, 1921.
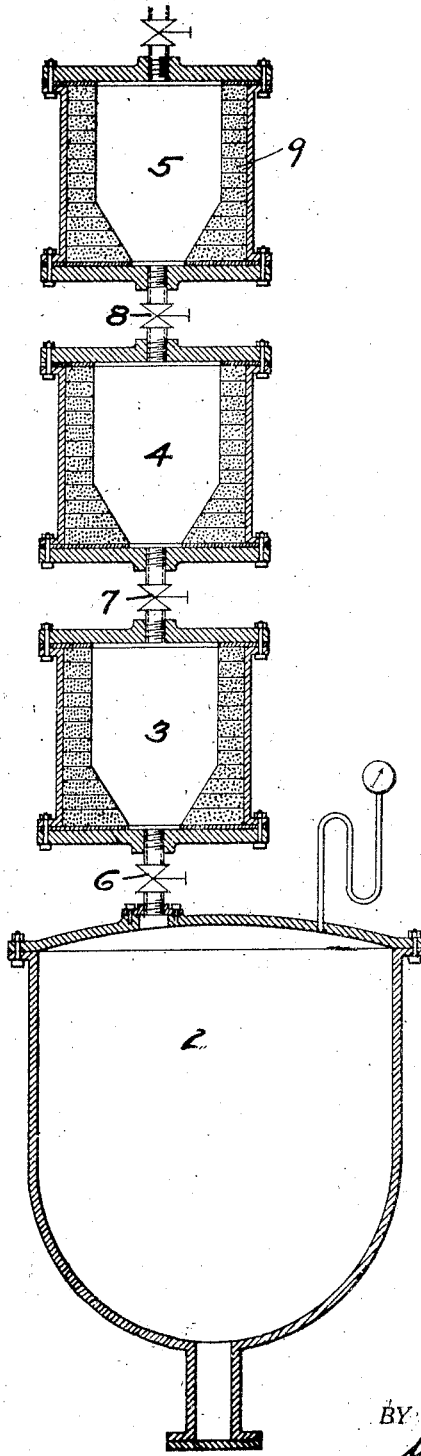
WITNESS,
LeRoy Hanscom.
INVENTOR,
H.D. RANKIN.
BY White & Prost
his ATTORNEYS

UNITED STATES PATENT OFFICE.

HARRY D. RANKIN, OF OAKLAND, CALIFORNIA, ASSIGNOR OF SEVEN-TENTHS TO LOUIS SLOSS, OF SAN FRANCISCO, CALIFORNIA.

DIGESTING APPARATUS.

1,364,803.   Specification of Letters Patent.   Patented Jan. 4, 1921.

Application filed June 26, 1918. Serial No. 242,121.

*To all whom it may concern:*

Be it known that I, HARRY D. RANKIN, a citizen of the United States, and a resident of Oakland, county of Alameda, and State of California, have invented certain new and useful Digesting Apparatus, of which the following is a specification.

The invention relates to an apparatus in which materials or substances are treated for the purpose of decomposing, transposing, dissolving, internally rearranging or rendering them soluble.

An object of the invention is to provide an apparatus for subjecting a mixture of liquid and material to high temperatures in a closed vessel.

Another object of the invention is to provide means for controlling the pressure of the gases and vapors in the vessel without wasting the gases and vapors.

A further object of the invention is to provide an apparatus for reducing the pressure of the gases and vapors when the pressure becomes excessive by withdrawing gases and vapor and subsequently introducing withdrawn gases and vapors when the pressure falls.

The invention possesses other advantageous features, some of which, with the foregoing, will be set forth at length in the following description, where I shall outline in full, that form of the invention which I have selected for illustration in the drawing accompanying and forming part of the present specification. In said drawing I have shown only one form of my invention, but it is to be understood that I do not limit myself to such form, since the invention, as expressed in the claims, may be embodied in a plurality of forms.

The drawing is a vertical section of a digesting apparatus embodying my invention.

Certain materials or substances are rebellious to chemical changes, even when treated with acids, but processes of treating such materials or substances to decompose, rearrange or render them soluble, have been developed and these processes involve the subjection of the material or substance in a closed vessel to the action of acid at a temperature equal to or in excess of the boiling point of the acid. This produces a very high pressure within the vessel, which is not essential to the desired reaction, rendering it necessary to construct the vessel of great ctural strength and rendering the sealig of large surfaces by gaskets very difficult. It is not practical to exhaust the gases and vapors within the vessel into the air, because these gases and vapors contain valuable matter and because they may be required subsequently, for carrying out the desired reaction.

In accordance with my invention therefore, I provide means for withdrawing gases and vapors from the vessel when the pressure becomes excessive and conserving these gases and vapors for subsequent use. The material to be treated, together with the desired amount of acid for producing the desired reaction is charged into the vessel 2, which is then sealed and heated to raise the temperature of the contents. Connected to the vessel are one or more excess vapor chambers, in the present instance there being three chambers 3, 4 and 5, connected together in series. The connection between the first chamber 3 and the vessel 2 is controlled by the valve 6 and the connections between the successive chambers are controlled by the valves 7 and 8. The chambers may be of any desired size or shape and are preferably lined with acid proof brick 9, so that they will not be deleteriously affected by the acid vapor. Instead of being connected together, the excess vapor chambers may be each independently connected to the vessel and in carrying out certain processes it may be desirable to employ only one chamber, instead of a plurality. Where the amount of excess vapor produced is large and the pressures produced are high, it is advantageous to employ a plurality of small chambers rather than one large chamber, since the total pressure on the walls of the large chamber would be very great.

In carrying out the process, the vessel or its contents are heated, producing a pressure therein and when this pressure reaches a predetermined value, the valve 6 is opened to permit some of the vapors to discharge into the chamber 3, thereby relieving the pressure within the vessel. Should this relief not be sufficient to prevent the subsequent formation of vapor from reaching an excessive temperature, the valve 7 is opened, placing chamber 4 in communication with the vessel. This operation is repeated as long as the pressure within the vessel tends to increase over the predetermined value. When the temperature of reaction is reached, and reaction occurs, the vapors in the vessel are absorbed by the material, reducing the pressure in the vessel, and when this occurs, one or more of the valves may be opened to permit the vapors to flow back into the vessel, to maintain a pressure therein, and if necessary, to supply sufficient vapor to complete the reaction. Should there be an excess of vapor over that necessary to complete the reaction, it is retained in the chambers and introduced into the vessel after the next charge of material has been entered therein. The vapors are maintained in the vapor chambers and are not condensed therein, the brick linings 9 possessing sufficient heat insulating properties to prevent condensation.

Prior to the use of the excess vapor chambers, it was necessary to employ concentrated acid in small quantities, or only in sufficient quantity to react with the material, without any appreciable excess, in order that prohibitive pressures would not be developed within the vessel. By the use of this invention, an excess of acid may be used, since it is not lost and does not produce prohibitive pressures and a dilute acid may be used. The dilute acid is desirable in the process because the water vapor is one of the greatest catalytic and chemical agents known and is further desirable on account of its lower cost.

I claim:

1. A digesting apparatus comprising a closed vessel in which material is adapted to be heated to produce hot vapors under pressure, a closed heat insulated chamber connected to the vessel in which excess vapors may be stored and means for controlling the flow of vapors between the chamber and vessel.

2. A digesting apparatus comprising a closed vessel in which material is adapted to be heated to produce hot vapors under pressure, a plurality of closed heat insulated chambers connected in series and connected to the vessel in which excess vapors may be stored and means for controlling the flow of vapors between the chambers and the vessel.

In testimony whereof, I have hereunto set my hand at San Francisco, California, this 17th day of June, 1918.

HARRY D. RANKIN

In presence of—
H. G. PROST.